Aug. 28, 1956  E. V. LARSON  2,761,043
VARIABLE RESISTANCE TRANSDUCER APPARATUS
Filed Oct. 16, 1952
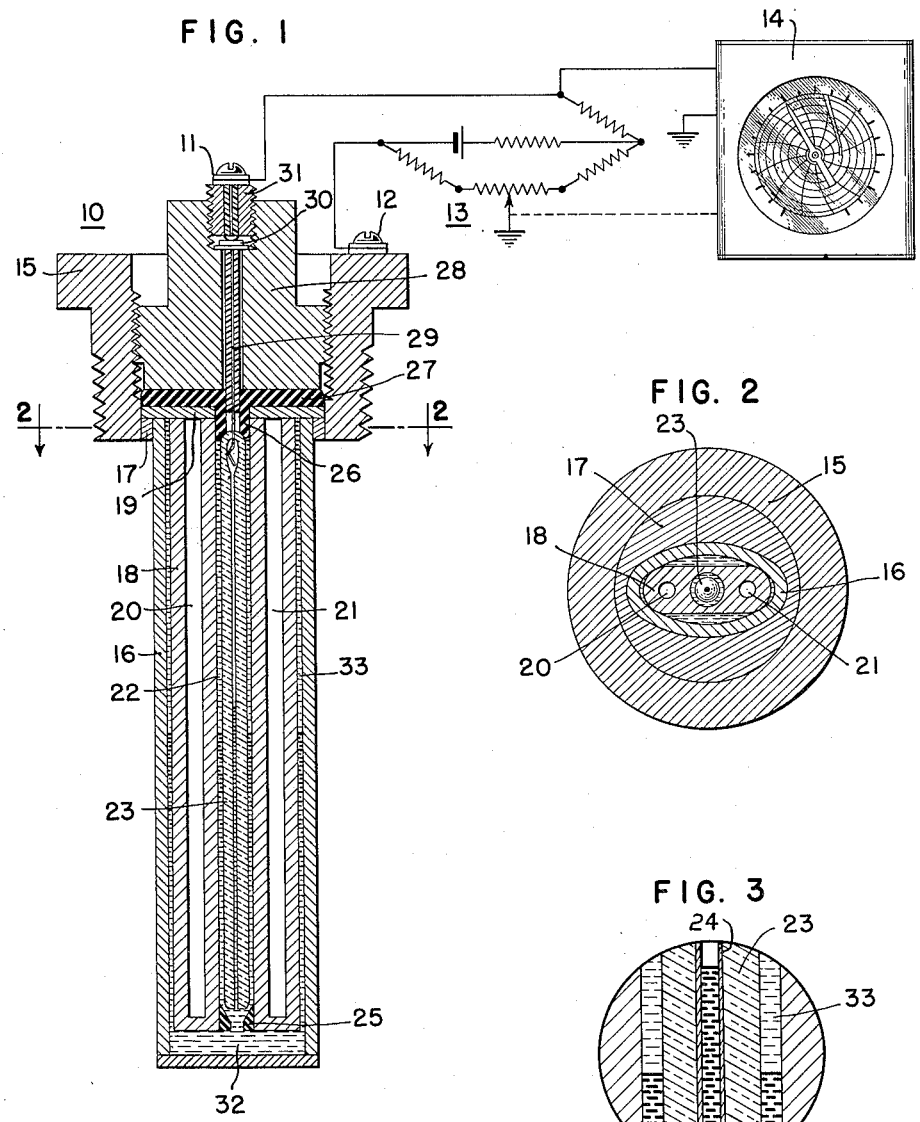
INVENTOR.
E. VICTOR LARSON
BY
ATTORNEY.

United States Patent Office 2,761,043
Patented Aug. 28, 1956

2,761,043

VARIABLE RESISTANCE TRANSDUCER APPARATUS

Erland Victor Larson, Elkins Park, Pa., assignor to Minneapolis-Honeywell Regulator Company, Minneapolis, Minn., a corporation of Delaware Application October 16, 1952, Serial No. 315,117

8 Claims. (Cl. 201—55)

A general object of the present invention is to provide a new and improved pressure measuring apparatus which will produce an electrical circuit change which is proportional to pressure change. More particularly the present invention is concerned with the provision of a pressure to electric transducer which employs a hollow non-porous ceramic tube having an electrically conductive coating on the hollow portion thereof with a column of electrically conducting fluid arranged to rise and fall in the tube in accordance with volume changes of a compressible element which is exposed to a pressure to be measured.

In the building of a pressure measuring apparatus, it is desirable that such an apparatus be made as universal as possible so as to minimize production and manufacturing costs. In making a universal type of pressure measuring apparatus it is essential that the apparatus be rugged, simple, and maintain a high degree of accuracy. In order to effect these results, it is essential that maximum protection be provided for all elements of the apparatus and that the apparatus be adequately compensated for temperature changes so that only pressure changes will be effective to give an output from the apparatus.

It has been desirable in the providing of maximum protection for the subject apparatus to provide a collapsible chamber and place therein a hollow ceramic tube having an electrically conducting coating thereon. This hollow ceramic tube in having a column of electrical short circuiting fluid rise and fall therein should be the only point in the apparatus where movement of the fluid will take place. If the hollow tube is completely enclosed within the collapsible element it is essential that some provision be made to cause the volume changes of the element to be felt solely in the hollow tube.

It is accordingly an object of the present invention to provide a new and improved pressure measuring apparatus.

A further object of the present invention is to provide a new and improved pressure measuring apparatus utilizing the rise and fall of an electrically conductive fluid in a hollow non-porous tube wherein said tube is completely enclosed within a collapsible element.

A still further object of the present invention is to provide a new and improved pressure measuring apparatus wherein an electrically conductive fluid of relatively dense material is caused to rise and fall in a capillary tube and this capillary tube is placed within a collapsible element which is filled partially with said relatively dense fluid and further filled with a fluid of lesser density so that all space within said collapsible element outside of said capillary is filled with an incompressible fluid.

The various features of novelty which characterize this invention are pointed out with particularity in the claims annexed hereto and forming a part of the specification. For a better understanding of the invention, however, its advantages, and specific objects obtained with its use, reference should be had to the accompanying drawings and descriptive matter in which is illustrated and described a preferred embodiment of the invention.

Figure 1 shows a cross sectional view of the present invention and also shows the manner in which it may be connected to a suitable indicating and recording apparatus;

Figure 2 shows a cross sectional view of a portion of Figure 1 taken along the center lines 2—2; and Figure 3 shows a portion of Figure 1 in enlarged cross section.

Referring now to Figure 1, the numeral 10 represents a pressure to electric transducer of the present apparatus. This transducer apparatus has a pair of electrical terminals 11 and 12 which connect the apparatus to a suitable bridge network 13. This bridge network may be a part of a suitable indicating and recording mechanism 14 which will take the electrical balance conditions of the bridge 13 and convert them into an appropriate meter indication and recorder operation. An apparatus which is suitable for use in this particular arrangement is shown in the Walter P. Wills Patent, 2,423,540, issued July 8, 1947. Walter P. Willis' apparatus is of the type which will respond to an electrical unbalance condition in the bridge 13 and will produce an appropriate meter operation as well as a rebalancing operation in the bridge 13.

Considering further the transducer 10, it will be seen that this apparatus comprises a coupling or connector 15 which is threaded on the outside as well as on the inside. The outer threads of the coupling 15 may be arranged to engage any appropriate threading in a vessel whose pressure is to be measured. Fastened to the lower edge of the inner threads of the coupling 15 is an elliptically shaped collapsible tube 16. This tube 16 is fastened by means of a suitable filler 17 which is welded to the top of the tube 16 as well as to the lower portion of the coupling 15. The cross sectional view of the coupling 15, the filler 17, and the tube 16 may be as shown in Figure 2, the latter figure being taken along the center lines 2—2 of Figure 1. The lower end of the tube 16 is sealed in a desirable manner so that fluids external of the tube will not be permitted to enter into the confines of the tube.

Positioned within the collapsible tube 16 is a protective element 18. This protective element may be suspended from a suitable washer 19 which fits over the outer edges of the tube 16 within the inner portion of the coupling 15. This protective element is generally selected from a material which has substantially zero temperature coefficient of expansion. The material may be Invar or of like material. The manner in which temperature compensation is effected by this will be discussed below. The cross sectional view of the protective element 18, shown in Figure 2, indicates that the cross sectional area of the protective element is smaller than the cross sectional area of the tube 16. The figure also indicates that the protective element has been selected to have an external dimension which will protect the tube 16 from collapse in the event that the tube is exposed to an excessive pressure. In other words, in the event of an excessive pressure being applied to the outside of the tube 16, the longer sides of the tube will collapse against the sides of the protective element 18. It will be obvious that there are many ways in which the protective element 18 and the tube 16 may be constructed. Details of certain types of tubes and protective elements are set forth and claimed in a copending application of Philip J. Donald, entitled "Measuring Apparatus" filed on even date herewith.

The protective element 18 has three holes extending therethrough, two of the holes, 20 and 21, are provided to cut down the thermal mass of the protective element. The third hole 22 is provided to enclose a capillary tube 23. This capillary tube may be formed of a ceramic non-porous material having a hole of relatively small diameter extending along the length of the tube. The tube is sealed at the upper end and open at the lower end so that fluid in the lower portion of the tube 16 will be free to rise into the hole in the tube. The tube 23 is supported at its lower end by a suitable centering and protective element 25 which may be formed of rubber or neoprene. The upper end of the tube 23 is maintained in position by a second resilient centering element 26. The centering element 26 is maintained in position by a compressible washer 27, which may be an integral part of the centering element and which fits down within the inner portion of the coupling 15 and is clamped there by a sealing plug 28. The sealing plug 28 has a center hole extending along the length thereof so that an electrical connection 29 may be passed from the tube 23 up through the plug 29 to a contacting position 30 so that an electrical contact can be made by a suitable adjusting plug 31 which has a terminal 11 attached thereto. When the plug 28 is turned into position it will compress the resilient washer 27 so as to tightly engage the wire extending from the tube 23 and also hold the centering member 26 in position.

Considering further the details of the tube 23, this tube has on the inner surface thereof an electrically conductive coating 24 which may be of a suitable metallic oxide. This metallic oxide has the characteristic of having an appreciable resistance per unit of area and which may be electrically short circuited by a suitable electrically conducting fluid. Its electrically conductive coating extends along the length of the tube and contact therewith is made at the upper end by the electrical connection 29 extending down from the connector 30. Connection at the lower end of the tube is established by an electrically conducting fluid, for example mercury, which fills the lower portion of the tube 16 and extends upwardly into the hollow portion of the tube 23. If the mercury were the only fluid present in the tube 16, and if it were desired for volume changes to cause the rise and fall of the fluid within the tube 23, there would be an evacuated space existing above the mercury not only within the tube 23 but also within the tube 16 outside of the tube 23. This condition is the direct result of the tendency of fluids to seek their own level and in doing so a space will be created above the fluid. Inasmuch as the tube 23 is completely within the confines of the tube 16, it is impossible to fill the enclosure with mercury inasmuch as the mercury would rise to the top of the tube 23 as well as to the top of the tube 16 and pressure changes would not produce a rise and fall in the tube 16 or in the tube 23 where the movement is desired. This presumes a vacuum within tube 23. As it is desirable that the fluid be free to rise and fall within the tube 23, special provision must be made to see that the fluid does not rise to the top of the tube 23 and that all of the internal volume changes of the tube 16 are felt solely in the hollow portion of the tube 23. This is accomplished by the placing of a fluid 33 whose density is less than that of the fluid 32 over the fluid 32. In so placing the fluid 33 over the fluid 32 the space above the fluid 32 outside of the tube 23 may be completely filled and if this fluid is sufficiently less dense than the fluid 32, the fluid 32 will be caused to rise only a small amount in the tube 23 so that the head of the fluid 32 in the tube 23 will in effect be supporting the head of the fluid 33 above the fluid 32 outside of the tube 23.

The substance of the fluid 33 may be of an incompressible material known as a synthesized oil substitute. One fluid successfully used is an oil known commercially as "Octoil." While the synthesized oil substitute is not required, the fluid that is used should have a low vapor pressure, low viscosity, a low temperature expansion coefficient and a density which is less than the electrically conductive fluid which is supporting the fluid.

While it may be desired to have all movement of the mercury be in the tube 23, the apparatus may also be arranged without the fluid 33 therein. In this instance, with a vacuum in the system, the fluid will move in both the tube 23 as well as in 16. Obviously, the amount of movement in tube 23 will be considerably less.

Figure 3 shows in enlarged detail a portion of Figure 1 with the tube 23 and the manner in which the lighter or filler fluid 33 is supported upon the dense electrically conducting fluid, or mercury 32, so that the mercury is forced upwardly into the hollow portion of the tube 23. The height to which the mercury will extend into the tube 23 will be directly dependent upon the height of the fluid 33 which the column of mercury within the tube 23 is supporting.

Considering now the operation of the apparatus, it is first assumed that the coupling 15 is used to fasten the apparatus 10 into a suitable chamber or enclosure where a pressure is to be measured. With an increase in pressure on the outside of the tube 16, the tube will tend to collapse and the internal volume thereof will decrease. Since the only space remaining within the tube 16 is within the hollow portion of the tube 23, the mercury 32 will be forced upwardly into the space. As the mercury rises into the space, the electrically conductive coating on the surface of the space will be short circuited and there will be a decrease in the resistance between the terminals 11 and 12. This decrease in resistance will be indicated by a change in the balance of the bridge 13 and the indicating and recording apparatus 14 will operate until a balance point has been reached. The position of the recording pens and the indicating mechanism will be proportional to the pressure applied to the outside of the tube 16. It will be obvious that with pressure decreases the volume within the tube 16 will increase and will tend to draw the mercury 32 out of the tube 23 so as to reduce the short circuiting effect of the mercury within the tube 23.

As most suitable electrically conducting fluids, such as mercury, have an appreciable temperature coefficient of expansion, it is essential that the apparatus be made insensitive to ambient temperature conditions. This is accomplished in the present apparatus by maintaining the volume of the mercury within the tube 16 relatively small. By maintain the volume small it means that less compensation need be provided. The compensation that is provided is in selecting the material of the collapsible tube 16 to have a particular temperature coefficient of expansion which will mean that with an increase in ambient temperature the volume of the tube 16 will increase. This increase in volume will tend to absorb the increase in volume of the mercury 32. The volume of the mercury is controlled by two principal factors, the first being the presence of the protector element 18 which, as mentioned above, may be made of Invar. The second is the presence of the fluid 33 which is selected to have a relatively low temperature coefficient of expansion. By properly selecting the magnitudes of the mercury and the fluid 33 as well as the relative sizes of the tube 16 and Invar protective element 18, it is possible to maintain the apparatus temperature insensitive with the volume increases of the fluids being compensated by the volume increases of the tube 16. It will be obvious that since the tube 23 is also present in the enclosure of the tubes 16 that its temperature coefficient of expansion must also be considered.

From the foregoing it will be seen that there has been provided a simple, rugged, sensitive pressure measuring apparatus of the pressure to electric transducer type. It will also be seen that the apparatus has been compensated for ambient temperature changes.

While, in accordance with the provisions of the statutes, there has been illustrated and described the best forms of the invention now known to me, it will be apparent to those skilled in the art that changes may be made in the form of the apparatus disclosed without departing from the spirit of the invention as set forth in the appended claims, and that in some cases certain features of the invention may be used to advantage without a corresponding use of other features.

Having now described the invention what it is desired to secure by Letters Patent is as follows:

1. In a pressure measuring apparatus having an electrical output signal proportional to an applied pressure, the combination comprising, an elongated collapsible metallic tube having a relatively thin wall which will permit the internal volume of said tube to make an appreciable change with changes of the pressure applied externally thereof, an elongated capillary tubing having a capillary in the center thereof with the surface of the capillary coated with an electrically conductive coating, said capillary tubing being completely within said tube, an electrically conducting fluid in the lower portion of said collapsible tube and extending within a portion of said capillary, a second fluid less dense than said first fluid completely filling the space remaining above said first fluid outside of said capillary and having sufficient height over said first fluid to maintain any vacuum within said apparatus only in said capillary, and means sealing both ends of said collapsible tube so that pressure changes on the external side of said collapsible tube will cause said first named conducting fluid to rise and fall only in said capillary.

2. In a pressure measuring apparatus having electrical output signals, the combination comprising, an elongated hollow thin wall collapsible tube arranged to have the external surface thereof exposed to a pressure to be measured, a hollow non-porous tube positioned completely within said collapsible tube and having the upper end thereof sealed, an electrical element within said last named tube and arranged to have its characteristic varied, an electrically conducting fluid arranged to rise and fall within said tube in accordance with pressure changes on the external side of said collapsible tube, a fluid less dense than said conducting fluid filling said collapsible tube outside of said non-porous tube so that changes in the internal volume of said collapsible tube will be felt solely by the rise and fall of the conducting fluid within said non-porous tube, and means sealing both ends of said collapsible tube.

3. In a pressure measuring apparatus, the combination comprising, a hollow collapsible element arranged to have the internal volume change therein with an external change in pressure applied thereto, a pressure sensitive device positioned completely within said element and having an evacuated space therein, said device having the upper end thereof sealed and the lower end thereof open, a first relatively dense fluid filling the lower portion of said element and extending into said device with an evacuated space above said fluid within said device, a second fluid of lesser density completely filling said element outside of said device so as to completely submerge said device within said element, and means rigidly sealing both ends of said element so that volume changes of said element will be directed solely to the movement of said first fluid within said device.

4. In a pressure measuring apparatus having an electrical output signal, the combination comprising, a hollow collapsible element having both ends thereof sealed, a pressure to electric transducer positioned completely within said collapsible element, said transducer comprising a non-porous ceramic element having a surface thereof coated with an electrically conductive coating which is arranged to be electrically short circuited by an electrically conductive fluid, and incompressible means including an electrically conductive fluid completely filling said collapsible element and extending over said surface of said ceramic element so that as said collapsible element is exposed to a pressure, the volume changes therein will be felt directly by the rise and fall of the conducting fluid over said surface of said ceramic elemeent.

5. In a pressure measuring apparatus, the combination comprising, an elongated hollow elliptical tube arranged to have the internal volume thereof change when exposed to a pressure on the external side thereof, incompressible means sealing both ends of said tube, a hollow non-porous ceramic tube positioned completely within said hollow tube, said ceramic tube having an electrically conductive coating on the inner surface thereof, an electrically conducting fluid filling a portion of said ceramic tube and arranged to electrically short circuit said coating, and an incompressible fluid completely filling said hollow tube external of said ceramic tube so that changes in pressure on the outside of said hollow tube will cause said conducting fluid to rise and fall in said ceramic tube.

6. Apparatus as set forth in claim 5, wherein said incompressible fluid has a low vapor pressure, low viscosity, low temperature coefficient of expansion, and a density less than said conducting fluid.

7. Apparatus as set forth in claim 5, wherein said incompressible fluid is an oil.

8. In a pressure measuring apparatus, the combination comprising, a collapsible hollow metallic tube, a hollow glass tube being sealed at one end and positioned adjacent one end of said first named tube and open at the other end with said other end being positioned near the other end of said first named tube, an electrically conductive coating on the hollow surface of said tube, a relatively dense electrically conducting fluid filling a lower portion of both of said tubes, a less dense fluid filling the remaining portion of said first named tube outside of said glass tube and causing said first fluid to rise in the hollow portion of said glass tube by an amount proportional to the height of said less dense fluid outside of said glass tube, and electrical terminals connected to the conductive coating of said glass tube and to said electrically conducting fluid by way of said first named tube so that the rise and fall of said first named fluid in said glass tube will produce an electrical change between said terminals as said first named tube is exposed to varying external pressures.

References Cited in the file of this patent

UNITED STATES PATENTS 2,566,369    Patman _____ Sept. 4, 1951

FOREIGN PATENTS 103,401    Great Britain _____ Jan. 25, 1917
906,665    France _____ May 22, 1945